United States Patent [19]

Sonkin

[11] Patent Number: 4,979,419
[45] Date of Patent: Dec. 25, 1990

[54] APPARATUS AND METHOD FOR TREATING BAKED GOODS

[76] Inventor: Richard Sonkin, 205 W. End Ave., Apt. 4J, New York, N.Y. 10023

[21] Appl. No.: 464,355

[22] Filed: Jan. 12, 1990

[51] Int. Cl.⁵ ............................................. B26D 3/06
[52] U.S. Cl. ...................................... 83/875; 30/300; 30/113.1; 83/13; 83/932; 99/538; 99/567; 408/72 R
[58] Field of Search .......................... 83/13, 875, 932; 99/547, 548, 538, 567; 30/113.1, 300; 408/203.5, 204, 72 R

[56] References Cited

U.S. PATENT DOCUMENTS

| | | | |
|---|---|---|---|
| 1,042,823 | 10/1912 | Richard | 408/204 X |
| 1,389,765 | 9/1921 | Krota | 30/300 X |
| 2,008,725 | 7/1935 | Parker | 107/19 |
| 2,720,176 | 10/1955 | Babbitt | 107/47 |
| 2,733,100 | 1/1956 | Simonsen | 299/60 |
| 2,754,587 | 7/1956 | Bylkas | 30/301 |
| 2,906,256 | 9/1959 | Glynn | 408/204 X |
| 3,810,308 | 5/1974 | Stubbmann | 30/130 |
| 3,922,107 | 11/1975 | Fowler | 408/204 X |
| 4,260,026 | 4/1981 | Deckert | 172/25 |
| 4,424,601 | 1/1984 | Weber | 7/113 |
| 4,497,245 | 2/1985 | Mori | 99/547 X |
| 4,789,555 | 12/1988 | Judd | 426/503 |

Primary Examiner—Douglas D. Watts
Assistant Examiner—Kenneth E. Peterson
Attorney, Agent, or Firm—Eckert Seamans Cherin & Mellott

[57] ABSTRACT

An apparatus and method for treating baked goods, such as bagels, is disclosed. An outer ring including downwardly projecting pins is secured to the cut surface of a previously sliced bagel half. A cutting disc having an upwardly projecting handle and downwardly projecting cutting blades is rotatable within the outer ring, which out ring serves as a guide and as a bearing. By turning the cutting disc while maintaining the bagel and the outer ring stationary, a circular trough will be cut in the dough of the bagel half by the cutting blades. In an antomatic version of the apparatus, a flat, upwardly projecting screw is mounted in a base plate and a bagel half is secured by base plate mounted pins about the flat screw. A cutting disc is provided with a slot to receive the flat screw in a manner to automatically rotate the cutting disc relative to the bagel when the cutting disc is axially moved toward the base plate.

7 Claims, 3 Drawing Sheets

APPARATUS AND METHOD FOR TREATING BAKED GOODS

BACKGROUND OF THE INVENTION

1. Field of the Invention:

The present invention relates generally to the field of baked goods, for example, bagels or rolls and more particularly, to an apparatus and method suitable to scoop excess dough from a previously cut half portion of the baked goods.

2. Discussion of the Prior Art:

At the present time, baked goods in generally round or annular configuration, such as bagels, are becoming increasingly popular for use as snacks, breakfast foods, sandwich components and the like. The presently available bagels are currently being baked in several different varieties by changing either or both the flour employed in the baked product and/or the spices, seeds or other comestibles which may be applied to the surface of the shaped bagel dough immediately prior to baking. Whatever type of flour or surface materials that may be employed, all of the bagels traditionally are similarly commonly configured to substantially that of an annulus or doughnut-shape.

In preparing a bagel for consumption, it is generally the usual practice to slice the bagel into two similar halve sections and then to apply some type of covering or food product either over the halves individually or between the previously cut halves. It is well known that the baked bagels are relatively high in calorie content and accordingly, many consumers prefer to scoop out or remove an interior portion of the previously cut bagel halves prior to consumption. In addition to significantly reducing the calorie count, the scooped out area provides a convenient, circular receptacle within which soft materials such as butter, cream cheese, meat products, cheese products and the like, can be spread. The variety of products which can be applied to sliced bagels can only be limited by the palate and the imagination of the user.

The current procedure for scooping and removing interior dough from previously cut bagel halves is for the preparer to simply pinch out the unwanted dough using his fingers. This procedure could not only be unsanitary, but also is time consuming and most inconvenient, especially when such a scooping procedure must be carried out in a busy restaurant or similar establishment where there may be numerous and substantially simultaneous requests for scooped out bagels. So far as is known to the present applicant, there is no suitable mechanical device that has hereinbefore been developed as an aid to removing interior portions of dough from a previously cut bagel, roll or other similar baked product.

SUMMARY OF THE INVENTION

The present invention relates generally to a novel apparatus and method for removing circular portions of dough from previously cut bagel halves prior to offering the bagel for consumption purposes.

The apparatus for treating baked goods of the present invention comprises generally a circular outer ring which may be fabricated of stainless steel, rigid, molded plastic or other suitable, sturdy material which can be readily cleaned and which will be entirely compatible and safe for use with food, such as baked products. A plurality of metal or other pins are circularly spaced about a surface of the outer ring and extend from the ring sufficiently to engage and become embedded beneath the surface of a bagel to temporarily secure the outer ring to the bagel half.

In one embodiment, an inner ring or disc is rotatable within the outer ring and is similarly fabricated of stainless steel, rigid plastic or other sturdy material suitable for the service. An operating handle projects upwardly from the top service of the inner ring or disc and is functionally shaped to be conveniently grasped by a hand of the user to rotate the inner ring relative to the outer ring. At least one pair or two pairs of diametrically opposed cutting blades are welded or otherwise securely fixed to the bottom surface of the inner ring and project downwardly in the direction of the bagel half to be treated. The cutting blades may be generally triangularly or arcuately shaped and are located on the bottom surface of the inner disc in position to contact and scoop out portions of the bagel dough from about one-quarter inch outwardly from the inner periphery of the cut bagel half to about one-quarter inch inwardly from the outer periphery of the cut bagel half. The cutting blades extend in length or depth sufficiently to remove bagel dough from a point about one-eighth of an inch upwardly from the bottom rounded surface of the cut bagel half.

In order to use the first embodiment of the present invention, a bagel is first cut into two substantially identical halves and then the outer ring portion of the cutter is downwardly applied against the cut surface of a previously cut bagel half. This embeds the projecting pins of the outer ring below the cut bagel surface and properly positions the outer ring to provide a bearing to facilitate rotary operation of the inner cutter or disc. With a bagel half thus secured to the outer ring, the inner or cutting ring is then applied with the blades positioned interiorly of the outer ring. The cutting blades are forced into the cut surface of the bagel half until the bottom surface of the inner disc of the cutter contacts either the cut top surface of the bagel half or the surface of the outer ring. Then, by grasping outer ring and the bagel to secure the same in position, the cutting disc is turned relative to the outer ring upon application of turning forces upon the handle. This rotates the cutting blades about the bagel half, thereby cutting and scooping out the unwanted, interior dough. The cutter is then removed from the bagel half and the operation can be repeated upon other halves of cut bagels as many times as required. The dough that has been cut from the inside of the bagel can then be either discarded or utilized for any other purpose that may be suitable for employing the excess dough.

In another embodiment of the invention, a base plate has been provided to bottomly secure a previously cut bagel half with the cut surface facing upwardly A centrally located boss projects into the bagel hole or opening and supports a stationary, upwardly extending, threaded guide or screw. A cooperating cutting disc is provided with a slot to receive the guide therein in a manner to rotate the cutting disc when the disc is downwardly urged toward the bagel. A handle extension projects upwardly from the top of the cutting disc and is provided of sufficient height to receive therein the upper portion of the threaded guide as the cutting disc approaches the cut surface of the bagel half. A large, flat handle is freely rotatably connected at the top of the handle extension. By applying downward pressure upon the flat handle, the cutting disc will be automatically rotated upon the threaded guide relative to the base plate and the pin-affixed bagel to thereby automatically cut out the unwanted portions of the bagel dough.

It is therefore an object of the present invention to provide an improved apparatus and method for treating baked goods of the type set forth.

It is another object of the present invention to provide a novel bagel scooper suitable to scoop and remove annular rings of dough from previously cut bagel halves.

It is another object of the present invention to provide a novel apparatus and method for treating baked goods which comprises generally an outer ring of hard material, a plurality of circularly spaced pins projecting axially downwardly from the outer ring to engage a previously cut bagel half, an inner, cutting disc rotatable within the outer ring, the cutting disc containing an upper handle and at least a pair of downwardly projecting, diametrically opposed cutting blades, the cutting blades being configured and positioned to hollow out the previously cut bagel half by removing excess dough.

It is another object of the present invention to provide a novel apparatus and method for treating baked goods comprising base plate means to support an upwardly projecting threaded guide within the central opening of a bagel half, pin means to temporarily secure the base plate means to the cut bagel half, cutting disc means rotatable upon the threaded guide, cutting blade means downwardly projecting from the cutting disc means, the cutting blade means being diametrically opposed and inwardly spaced from the outer periphery of the cutting disc means, the cutting blade means projecting sufficiently downwardly from the bottom of the cutting disc means to cut a circular groove in the cut bagel half when the cutting disc means is rotated relative to the base plate means and to the bagel half.

It is another object of the present invention to provide a novel apparatus for treating baked goods that is simple in design, rugged in construction and inexpensive in manufacture.

Other objects and a fuller understanding of the invention will be had by referring to the following description and claims of a preferred embodiment thereof, taken in conjunction with the accompanying drawings, wherein like reference characters refer to similar parts throughout the several views, and in which:

DESCRIPTION OF THE PREFERRED EMBODIMENTS OF THE INVENTION

Figure 1:
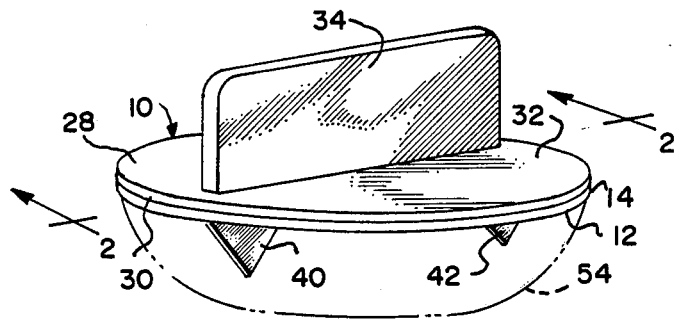
FIG. 1 is a perspective view of a first embodiment of an apparatus for treating baked goods in accordance with the teachings of the present invention, with a bagel half shown in phantom lines for purposes of association.

Although specific terms are used in the following description for the sake of clarity, these terms are intended to refer only to the particular structure of the invention selected for illustration in the drawings, and are not intended to define or limit the scope of the invention.

Figure 2:
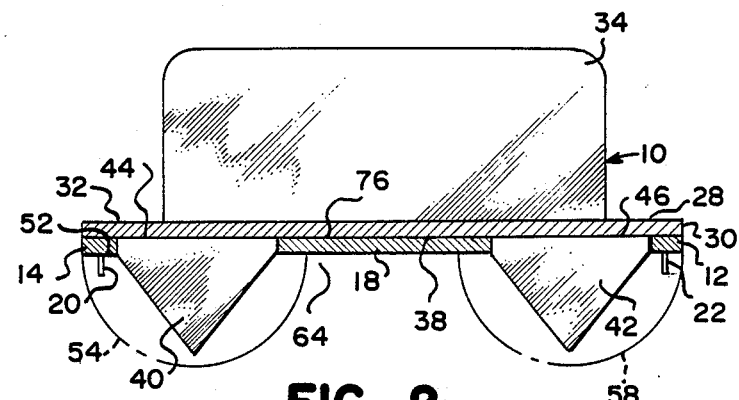
FIG. 2 is a cross sectional view taken along line 2—2 on FIG. 1, looking in the direction of the arrows.

Referring now to the drawings, there is illustrated in FIGS. 1 and 2 an apparatus or cutter 10 for treating baked goods, such as bagels 54. The cutter 10 comprises generally a relatively thin outer ring 12 of outer diameter suitable to overfit and correspond to the generally accepted outer diameter of a round baked product, such as a baked product of the type usually designated as a bagel. The outer ring 12 may be fabricated of stainless steel, rigid, hard thermoplastic plastic or other material suitable for use with food products which can be machined, molded or otherwise formed to the necessary shape. The material chosen for the service should be non-deforming and should and be readily washable and cleanable so as not to contaminate the bagel or other baked products while in use. A cutting disc 28 is rotatable upon the outer ring 12 and preferably is fabricated of the same, non-deformable, food-compatible material such as stainless steel or rigid plastic.

The bottom surface 18 of the outer ring 12 is designed and intended to rest directly against the flat cut surface 52 of a bagel 54 when the bagel is sliced in half in the usual manner. A plurality of bagel contacting pins 20, 22, 24, 26 project axially downwardly from the bottom surface 18 the outer ring 12 to penetrate and engage the bagel half being treated. The pins are preferably equally spaced about the ring bottom surface 18 and can be fabricated of stainless steel, hard plastic or other suitable material that can be safely used with food products. The outer ring 12 is employed to provide a bearing surface for the cutting disc 28, which bearing surface comprises the top surface 76 of the outer ring 12. The plurality of downwardly projecting pins temporarily secure the outer ring 12 to the bagel half 54 during the dough scooping process. The outer periphery 14 of the outer ring 12 should be a complimentary to the outer periphery of a usually-dimensioned bagel so that the device will be suitable for use with substantially all popularly sized bagels.

The upper cutting disc 28 is similarly preferably fabricated of stainless steel, rigid plastic or other material suitable for use with food products and is preferably discoid in configuration and of suitable size to overfit and turn upon the outer ring 12. The outer periphery 30 of the cutting disc 28 is preferably complimentary to the outer periphery 14 of the outer ring 12 when the device is in use. As illustrated, the bottom surface 38 of the cutting disc 28 contacts and bears against the top surface 76 of the outer ring 12.

The cutting disc 28 comprises an upper or top surface 32 which faces away from the bagel 54 during the bagel scooping process. A sturdy handle 34 projects upwardly from the top disc surface 32 and preferably is centrally positioned to facilitate rotating the cutting disc 28 relative to the outer ring 12 when the handle 34 itself is rotated. Preferably, the handle 34 is fabricated of the same material which comprises the disc 28 and is permanently secured thereto in any well known, suitable method of fabrication. For example, if the parts 28, 34 are fabricated of stainless steel, the handle could then be permanently welded to the top surface 32 of the disc 28. If the cutting disc 28 is fabricated of thermoplastic plastic, the handle 34 could be integrally molded therewith or alternately plastic welded thereto using known plastic fabricating techniques.

Figure 4:
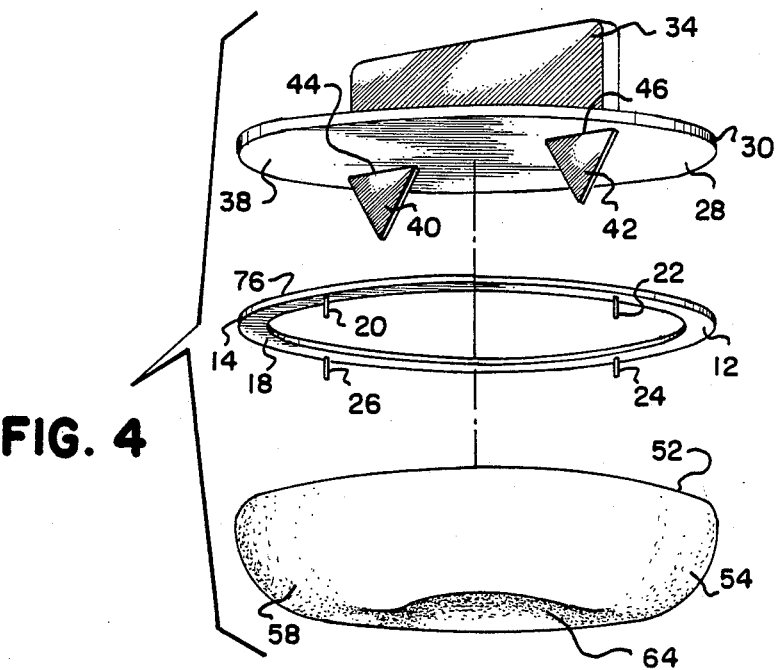
FIG. 4 is an exploded, perspective view of the parts of the invention illustrated in FIGS. 1 and 2.

As best seen in FIGS. 2 and 4, at least a pair of diametrically spaced, diametrically aligned cutting blades 40, 42 project downwardly from the bottom surface 38 of the inner or cutting disc 28 and preferably are fabricated of identical configuration. The cutting blades 40, 42 are provided to simultaneously cut or scoop equal portions of dough from the bagel half 54 when the cutting disc 28 is turned relative to the outer ring 12. The cutting blades 40, 42 are preferably fabricated of sharpened stainless steel and are welded or otherwise permanently affixed and secured to the bottom surface 38 of the cutting disc 28. As illustrated, the upper surfaces 44, 46 of the cutting blades 40, 42 are permanently secured by welding to the bottom surface 38 of the cutting disc 28.

The cutting blades 40, 42 preferably may be generally triangularly-shaped in configuration to scoop a triangularly-shaped trough in the bagel half 54 when the cutting disc 28 is rotated relative to the bagel half. If desired, the cutting blades 40, 42 could be arcuately or otherwise shaped as found most efficient for the intended cutting or scooping operations. The respective cutting blades 40, 42 are positioned on the cutting disc 28 to project downwardly into the cut bagel half 54 and to dig out or scoop out the dough to be removed from approximately one-quarter inch from the outer periphery of the bagel to approximately one-quarter inch from the usual central opening 78 of the bagel 54. The cutting blades 40, 42 extend in length or depth sufficiently to reach downwardly to a location approximately one-eighth of an inch from the bottom or outer surface 58 of the bagel half when the device is in use. In this manner, an annular trough can be readily cut in the bagel half 54 so as to remove a considerable portion of the bulk and the attendant calories of the bagel half while still allowing sufficient portions of the bagel to remain. Accordingly, the scooping operations will not interfere with the taste of the bagel or with the structural integrity of the bagel half when it is being filled with a desired filler, for example cream cheese, meat, lox, butter, cheese spread, etc.

Figure 3:
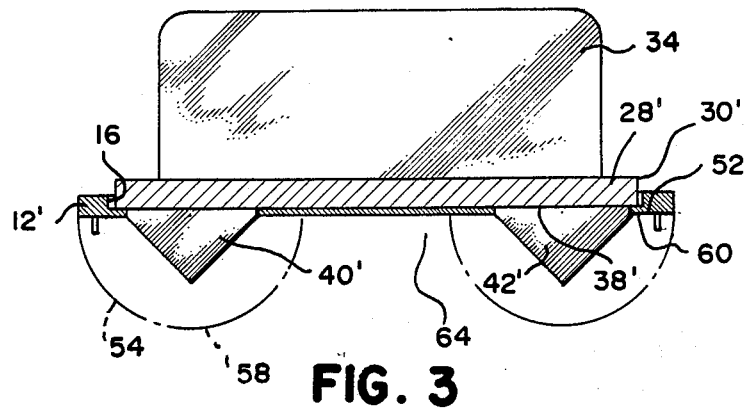
FIG. 3 is a cross sectional view similar to FIG. 2 showing a modified construction.

In the modification illustrated in FIG. 3, the cutting disc 28' is fabricated of diamerter suitable to fit within and turn within the inner periphery 16 defined by the modified outer ring 12. Preferably, a small, thin radially inwardly projecting flange 60 extends from the bottom of the outer ring 12' to receive the bottom outer periphery of the cutting disc 28'. Thus it will be seen that the combined inner peripheral surface 16 and flange 60 (if used) of the outer ring 12' serve as a bearing which receives the outer periphery 30 of the cutting disc to facilitate turning the cutting disc 28' relative to the outer ring 12'. The cutting blades 40', 42' secured to the bottom surface 38' of the cutting disc 28' and may be modified in configuration as necessary to turn with the opening defined within the outer ring 12'.

Figure 5:
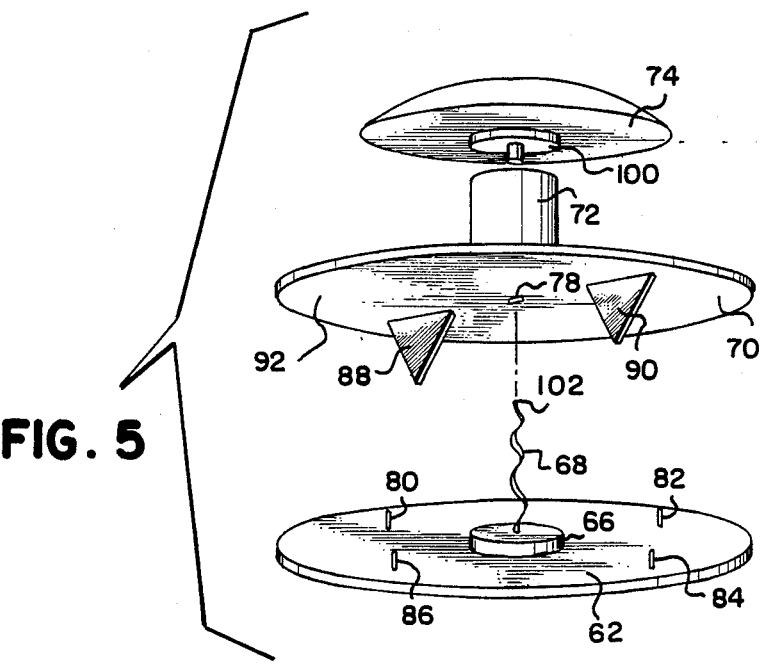
FIG. 5 is an exploded, perspective view of a second embodiment of the invention.
Figure 6:
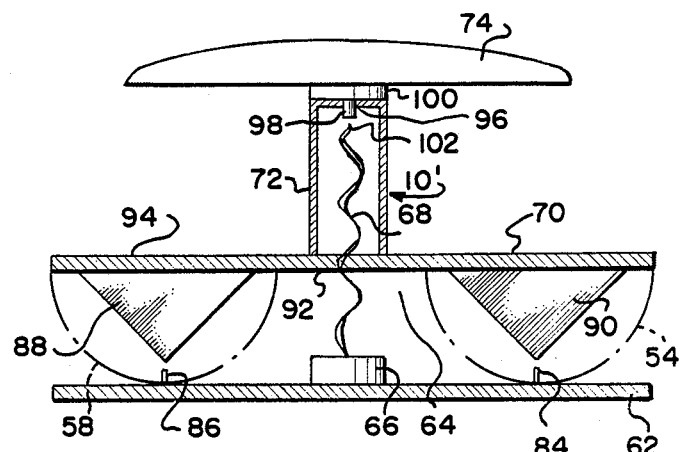
FIG. 6 is a cross-sectional view of the embodiment illustrated in FIG. 5, with the cutting disc positioned in its final, lower position.
Figure 7:
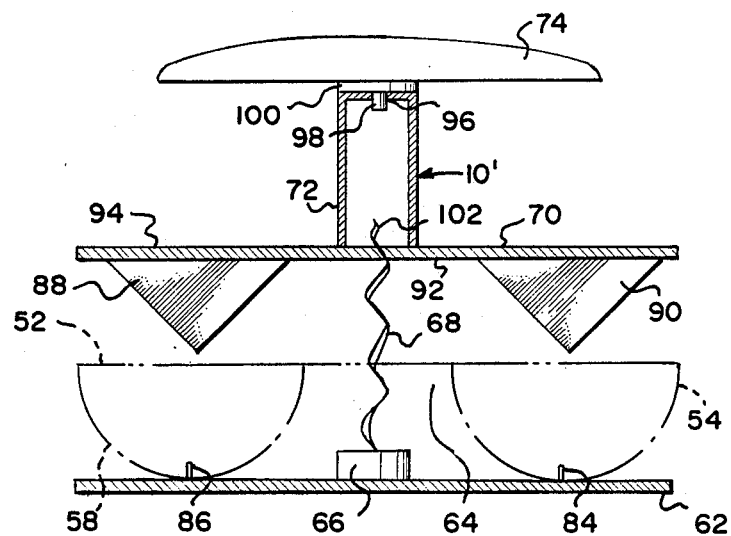
FIG. 7 is a cross sectional view similar to FIG. 6, with the cutting disc in the initial, upper position.

Referring now to FIGS. 5, 6 and 7 a second embodiment 10' of a cutter or scooper is illustrated. In this embodiment, a stainless steel or rigid base plate 62 is provided with a plurality of upwardly projecting, circularly spaced pins 80, 82, 84, 86 to penetrate into the outer, bottom periphery 58 of a bagel half 54 to secure the bagel half to the base plate 62 during the dough scooping or removal operations. A concentric boss 66 may be integrally formed on the base plate 62 and extends upwardly to partially enter the bagel central hole or opening 64. An elongated, flat, threaded guide or screw 68 is anchored in the boss 66 and extends upwardly therefrom to stationarily position within the bagel opening or hole 64 when a bagel half 54 is applied upon the base plate 62.

The modified cutting disc 70 is provided with a small, rectangular slot 78 of size and shpe to receive the flat, threaded guide or screw therein. The interaction of the sides of the slot 78 with the flat surfaces of the flat screw 68 will cause the cutting disc 70 to rotate relative to the base plate 62 when the cutting disc 70 is moved axially toward or away from the base plate 62. Shaped cutting blades 88, 90 downwardly project from the bottom surface 92 of the cutting disc 70 to enter into the flat, cut surface 52 of the bagel half 54 during the cutting operations. A handle extension extends from the top surface 94 of the cutting disc 70 and is concentrically arranged over the slot 78 to receive therein upper portions of the flat threaded guide 68 when the cutting disc is moved toward the base plate 62 for bagel scooping purposes.

The handle extension 72 is upwardly closed to provide a bearing connection with a flat, circular handle 74. In the illustrated embodiment, the flat handle 74 is illustrated with a downwardly projecting, concentric hub or boss 100 to secure therein a pin or shaft 98. The pin or shaft 98 downwardly projects and interacts with the bearing 96 in known manner to facilitate rotative movement of the cutting disc 70 relative to the handle 74. In use, it will be appreciated that the base plate 62, the bagel 54 and the handle 74 are intended to be non-rotative. With the parts separated, the bagel 54 in temporarily secured to the base plate 62 by pressing the bagel downwardly onto the pins 80, 82, 84, 82 with the flat screw 68 projecting upwardly through the bagel hole 64. The cutting disc slot 78 is then applied over the top 102 of the the flat screw or guide 68 and the cutting disc is downwardly, axially urged toward the base plate 62 by grasping and applying downward pressure on the flat circular handle 74. The interaction between the slot 78 and the flat guide 68 will cause rotation of the cutting blades 88, 90, thereby cutting or scooping out a circular trough of dough from the bagel 54 as the cutting disc is urged from its upper position as illustrated in FIG. 7 towards its lower position, as illustrated in FIG. 6.

In order to use the cutter or scooper 10 of the first embodiment of the invention, a bagel 54 should first be cut into substantially identical halves so that each half has a flat cut surface 52. With the rounded bottom surface 58 of the bagel half 54 applied against a support surface (not shown) and with the flat, cut surface 52 facing upwardly, the outer ring 12 or 12' can then be applied over the flat surface 52 with the plurality of pins 20, 22, 24, 26 impressed downwardly directly into the bagel. The outer ring pins temporarily secure the outer ring 12 or 12' to the cut bagel half 54 in an easily releasable manner. As shown in FIG. 3, the cutting disc 28' is then applied interiorly of the outer ring 12' so that the outer peripheral surface 30' of the inner disc 28' interiorly overfits the inner peripheral surface 16 (and flange 60) of the outer ring 12' in a manner to be easily rotatable therewithin. Thus it is seen that the inner periphery 16 (and flange 60, if used) of the outer ring 12' serves as a circular bearing when the device is in use. In the embodiment of FIG. 2, the bottom of the cutting disc 12 will be applied directly upon the top surface 76 of the outer ring 12.

The inner disc 28, 28' should be pressed or applied downwardly toward the bagel half 54 until the cutting blades 40, 42 or 44', 42' penetrate into the bagel half for substantially their entire length or height. In this position, the bottom outer peripheral surface 38, 38' of the cutting disc 28, 28' will rest against the flat cut surface 52 of the bagel half 54 and the cutting disc 28, 28' will be in substantial planar alignment with the outer ring 12.

With the parts so positioned relative to each other and relative to the bagel half 54, the handle 34 can then be grasped by one hand (not shown) of the user and the outer ring 12, 12' and the cut bagel 54 should be grasped and held by the other hand of the user. Then, upon applying rotative forces to the handle 34 only, while maintaining the outer ring 12, 12' and the bagel 54 stationary, the cutting blades 40, 42 or 40', 42' will be caused to cut an annular trough in the bagel half 54. The cut and severed dough from inside of the bagel half can be easily discarded simply by removing the cutter 10 from association with the bagel and then turning the bagel half upside down to discharge the severed materials. As many bagel halves as required can be serially treated in the same manner in turn to thereby considerably speed up and uniformly cut any desired number of bagel halves in a sanitary manner.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. An apparatus for cutting a circular trough in a previously cut bagel half of the type having a planar top surface, a rounded bottom surface and a central opening comprising
    a base plate positioned beneath the bagel half,
        the base plate supporting a stationary, upwardly extending, flat screw;
    a cutting disc axially movable toward the base plate, above the bagel half,
        the cutting disc being provided with a rectangular opening to receive the flat screw therein;
    at least one cutting blade downwardly projecting from the cutting disc,
        the cutting blade being shaped to enter into and to cut a circular trough in the bagel half when the cutting disc is axially urged toward the base plate;
    a handle extension projecting upwardly from the cutting disc in position to receive portions of the flat screw when the cutting disc is moved towards the base plate; and
    a handle rotatably secured to the handle extension to axially urge the cutting disc toward the base plate;
    whereby the cutting blade will be caused to enter into and to automatically rotate within the bagel half upon pushing the cutting disc toward the base plate to cut the circular trough.

2. The apparatus of claim 1 and a bearing interconnection between the handle and the handle extension.

3. An apparatus for treating baked goods of a type configured in the shape of an annulus and defining a top surface, a bottom surface, an outer periphery and an inner periphery, the apparatus comprising:
    outer, stationary ring means for application to the top surface of the baked goods, the outer ring means comprising
        an outer peripheral surface, an inner peripheral surface, a top surface, a bottom surface to contact the top surface of the baked goods and a baked goods gripping means projecting from the bottom surface, a bottom flange being positioned in planar alignment with the bottom surface of the outer ring means, said bottom flange extending peripherally radially inwardly from the said inner peripheral surface; and
    disc means contacting and being rotatable relative to the outer ring means, the disc means comprising an upper surface and a lower surface, a handle projecting upwardly from the upper surface and at least one cutting blade projecting downwardly from the lower surface, the disc means being axially displaceable relative to the outer ring means sufficiently to permit the cutting blade to penetrate into the baked goods through said top surface thereof;
    whereby a circular trough can be cut in the baked goods by the cutting blade upon rotation of the disc means relative to the outer ring means.

4. An apparatus for treating baked goods of a type configured in the shape of an annulus and defining a top surface, a bottom surface, an outer periphery and an inner periphery, the apparatus comprising:
    outer, stationary ring means for application to the top surface of the baked goods, the outer ring means comprising
        an outer peripheral surface, an inner peripheral surface, a top surface, a bottom surface to contact the top surface of the baked goods and a baked goods gripping means projecting from the bottom surface; and disc means contacting and being rotatable relative to the outer ring means, the disc means comprising
        an upper surface and a lower surface, a handle projecting upwardly from the upper surface and at least one cutting blade projecting downwardly from the lower surface, the disc means being axially displaceable relative to the outer ring means sufficiently to permit the cutting blade to penetrate into the baked goods through said top surface thereof; said lower surface of the disc means contacting and rotating upon said top surface of the outer ring means;
    whereby a circular trough can be cut in the baked goods by the cutting blade upon rotation of the disc means relative to the outer ring means.

5. An apparatus for cutting a circular trough in a previously cut bagel half having a cut, planar top surface, a rounded bottom surface, an outer peripheral surface and an inner peripheral surface, comprising:
    an outer ring of rigid material, the outer ring having an annular body with a diameter sufficient to overfit the cut bagel half radially inwardly of the said outer peripheral surface, the annular body being defined by an inner bearing surface;
    a plurality of pins projecting downwardly from the body of the outer ring sufficiently to penetrate downwardly into the cut surface of the bagel half;
    a cutting disc rotatable within the outer ring, the cutting disc defining a top, a bottom and an outer peripheral surface, the outer peripheral surface of the cutting disc fitting within and being rotatable within the bearing surface of the outer ring;

means to rotate the cutting disc relative to the outer ring and to the bagel half; and a cutting blade means downwardly projecting from the bottom of the cutting disc, the cutting blade means projecting downwardly from the bottom by a distance less than a distance between said top surface and said rounded bottom surface of the cut bagel half, the cutting blade traversing the bagel half to cut a circular trough in the bagel half when the inner cutting disc is rotated relative to the outer ring, said cutting blade means comprising a pair of diametrically spaced cutting blades, the cutting blades being substantially radially oriented on the cutting disc.

6. A method of treating baked goods of a type configured as a rounded annulus, comprising:

slicing the baked goods to form substantially equal halves, each half comprising a planar upper surface, a rounded bottom surface, an outer periphery and an inner periphery;

applying an outer ring having a top surface and inner and outer peripheral surfaces over the planar upper surface, exposing at least part of the upper surface interiorly of the outer ring;

providing a cutting disc with a cutting blade affixed to a bottom of the cutting disc, the cutting disc having an outer periphery, and positioning the cutting disc in axial alignment with the outer ring;

axially moving the cutting disc relative to the outer ring to penetrate the upper surface of the baked goods with the cutting blade, said axially moving step comprising positioning the cutting disc upon the top surface of the outer ring; and rotating the cutting disc relative to the outer ring and thereby gouging a circular trough in the baked goods.

7. A method of treating baked goods of a type configured as a rounded annulus, comprising:

slicing the baked goods to form substantially equal halves, each cut half comprising a planar upper surface, a rounded bottom surface, an outer periphery and an inner periphery;

applying an outer ring having a top surface and outer peripheral surfaces over the planar upper surface and exposing at least part of the upper surface interiorly of the outer ring;

providing a cutting disc with a cutting blade on a bottom thereof, the cutting disc having an outer periphery, and positioning the cutting disc in axial alignment over the outer ring;

axially moving the cutting disc relative to the outer ring to penetrate the upper surface of the baked goods with the cutting blade; and rotating the cutting disc relative to the outer ring, utilizing the outer ring as a bearing for cutting disc rotation, and thereby forming a circular trough in the baked goods.

* * * * *